US011009379B2

(12) United States Patent
Suzuki et al.

(10) Patent No.: US 11,009,379 B2
(45) Date of Patent: May 18, 2021

(54) GAS FLOW RATE MEASUREMENT DEVICE

(71) Applicant: Hitachi Automotive Systems, Ltd., Hitachinaka (JP)

(72) Inventors: Kazunori Suzuki, Hitachinaka (JP); Keiji Hanzawa, Hitachinaka (JP); Junichi Horie, Hitachinaka (JP); Akira Kotabe, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 146 days.

(21) Appl. No.: 16/349,783

(22) PCT Filed: Nov. 8, 2017

(86) PCT No.: PCT/JP2017/040193
§ 371 (c)(1),
(2) Date: May 14, 2019

(87) PCT Pub. No.: WO2018/116676
PCT Pub. Date: Jun. 28, 2018

(65) Prior Publication Data
US 2019/0353509 A1 Nov. 21, 2019

(30) Foreign Application Priority Data
Dec. 20, 2016 (JP) .............................. JP2016-246363

(51) Int. Cl.
*G01F 1/696* (2006.01)
(52) U.S. Cl.
CPC .................... *G01F 1/696* (2013.01)
(58) Field of Classification Search
CPC ........................ G01F 1/696; G01F 1/6965
See application file for complete search history.

(56) References Cited

U.S. PATENT DOCUMENTS 6,904,379 B1 6/2005 Hanzawa et al.
9,743,057 B2 * 8/2017 Cote .................. H04N 5/23254
(Continued)

FOREIGN PATENT DOCUMENTS

JP 2003-106887 A 4/2003
JP 2007-071889 A 3/2007
(Continued)

OTHER PUBLICATIONS

International Search Report issued in corresponding PCT Application No. PCT/JP2017/040193 dated Feb. 13, 2018.

*Primary Examiner* — Francis C Gray
(74) *Attorney, Agent, or Firm* — Foley & Lardner LLP

(57) ABSTRACT

The present invention provides a thermal flow rate measurement device that is capable of highly accurate correction of the temperature of an intake gas flow rate using a two-dimensional correction map that stores a correction value in association with temperature and intake gas flow rate. A gas flow rate measurement device that corrects a flow rate detection signal using a correction amount in which the correction amount is a correction amount in which a position displaced from a grid point of an orthogonal grid on a correction map 100A is an acquisition point 102, and stores positional information of the acquisition point 102 on the correction map 100A, and, at a time of flow rate measurement, determines a reference input flow rate that refers to the correction map 100A on the basis of the positional information from a flow rate detection signal, determines a reference input temperature that refers to the correction map 100A on the basis of the positional information from a temperature detection signal, and determines a correction amount corresponding to an input flow rate of an input flow rate Q axis corresponding to the reference input flow rate (Continued)

and an input temperature of an input temperature T axis corresponding to the reference input temperature.

6 Claims, 13 Drawing Sheets

(56) References Cited

U.S. PATENT DOCUMENTS

| | | | |
|---|---|---|---|
| 10,161,775 B2* | 12/2018 | Ferrara | F02D 41/1454 |
| 2006/0074570 A1* | 4/2006 | Belke | G01F 1/125 |
| | | | 702/50 |
| 2007/0125169 A1* | 6/2007 | Nakano | G01F 1/6845 |
| | | | 73/204.26 |
| 2009/0299657 A1* | 12/2009 | Mizutani | G01F 1/696 |
| | | | 702/45 |
| 2011/0035165 A1* | 2/2011 | Koyama | G05B 23/0221 |
| | | | 702/45 |
| 2012/0180877 A1 | 7/2012 | Pallais | |
| 2014/0190270 A1 | 7/2014 | Suzuki et al. | |

FOREIGN PATENT DOCUMENTS

| | | |
|---|---|---|
| JP | 2009-288153 A | 12/2009 |
| JP | 2013-076601 A | 4/2013 |
| WO | WO-02/052138 A2 | 7/2002 |
| WO | WO-2014/024621 A1 | 2/2014 |

* cited by examiner

| Q | SECONDARY COEFFICIENT (Ka) |
|---|---|
| 0 | Ka1 |
| Q1 | Ka2 |
| Q2 | Ka3 |
| : | : |
| Qn | Kan |

31

GAS FLOW RATE MEASUREMENT DEVICE

TECHNICAL FIELD

The present invention is directed to a thermal flow rate measurement device for measuring gas flow rate and relates to a gas flow rate measurement device for correcting a measured gas flow rate on the basis of a map (table) on which correction constants are arranged.

BACKGROUND ART

An automotive engine requires measurement of intake gas flow rate to control a fuel injection amount. A type of device for measuring an intake gas flow rate includes a thermal flow rate measurement device that uses a heat resistor. The thermal flow rate measurement device is configured to perform heat transfer between a flow rate detection unit formed in a flow rate detection element and an intake gas flow rate, which is a measurement target, to measure an intake gas flow rate. The thermal flow rate measurement device can measure the intake gas flow rate with high accuracy by correctly correcting thermal effects from measurement environments.

An automotive thermal flow rate measurement device is attached to an intake pipe for introducing intake gas to the engine. Therefore, it is subjected to heat generated by the engine, temperature changes in natural environments, and effects of temperatures that change depending on heat from a vehicle body heated by direct sunlight. Accordingly, the thermal flow rate measurement device requires highly accurate correction of the intake gas flow rate to reduce the temperature effects. The thermal flow rate measurement device reduces the temperature effects by correcting a detection signal of the intake gas flow rate on the basis of gas temperature, substrate temperature, or the like.

Meanwhile, as a thermal flow rate measurement device that performs adjustment to bring a detection signal closer to target output characteristics, a thermal gas flow rate meter described in JP 2007-071889 A (PTL 1) is known. In the thermal gas flow rate meter of PTL 1, a heating resistance element having temperature-dependent property is arranged in a gas flow channel and a gas flow rate is measured from an output value of a gauge circuit having the heating resistance element. The thermal gas flow rate meter includes an arithmetic circuit having a map data related to gas flow rate-output characteristics. The arithmetic circuit divides a region of map data more finely in a low flow region than in a high flow region of the gas flow rate, and corrects the output characteristics with respect to each gas flow rate region. Thus, the thermal gas flow rate meter of PTL 1 achieves highly accurate gas flow rate measurement by means of a small-scale circuit configuration (see the Abstract).

CITATION LIST

Patent Literature

PTL 1: JP 2007-071889 A

SUMMARY OF INVENTION

Technical Problem

In recent years, because of improvement of fuel efficiency and tightening of emission regulations, the accuracy required for thermal flow rate measurement devices has been increased. Furthermore, because of downsizing of an engine exhaust amount, miniaturization of the layout in an engine room has been progressed. Therefore, as environments where the thermal flow rate measurement device is used is closer to the engine, high accuracy of measurement of an intake gas flow rate in environments where temperature change is harsh is required. For a thermal flow rate measurement device used in such environments, when the temperature of intake gas is largely changed, a correction value (correction amount) required with respect to each flow rate is different.

The thermal gas flow rate meter of PTL 1 uses a map (correction map) obtained by dividing a data region at irregular intervals in order to increase accuracy of measurement of an intake gas flow rate with a minimum resolution.

In general, a map for correcting temperature effects is a temperature-flow rate two-dimensional map. When a temperature, e.g., an intake temperature, is changed, a correction value for performing correction to an intake flow rate corresponding to the temperature is calculated on the basis of the two-dimensional map, and a measurement value of the intake gas flow rate is corrected.

The two-dimensional map is, as illustrated, for example, in FIG. 12B, a map on which temperature is plotted on the horizontal axis and intake gas flow rate is plotted on the vertical axis. A correction value (correction data) is set at grid points indicated by the black circles corresponding to temperatures set at regular intervals and flow rates set at regular intervals. In this case, a correction value is set at grid points of an orthogonal grid on which the line in the horizontal axis direction (row in a temperature change direction) and the line in the vertical axis direction (row in an intake gas flow rate change direction) are orthogonal. Even if a data region is divided at irregular intervals as in the case of PTL 1, the grid intervals merely become irregular intervals, and a correction value is set at grid points of the orthogonal grid.

In general, when a correction value is preliminarily determined experimentally or the like and is stored on a map, data in which a resulting correction value corresponds to grid points of an orthogonal grid cannot be obtained. Therefore, a conceivable way would be a method of calculating a correction value corresponding to grid points of an orthogonal grids e.g., by interpolation from a resulting correction value. However, when a correction value corresponding to grid points of an orthogonal grid is calculated by mere interpolation, an error in the calculated correction value is large, resulting in a problem that the accuracy of correcting the intake gas flow rate is deteriorated.

It is an object of the present invention to provide a thermal flow rate measurement device that is capable of highly accurate correction of the temperature of an intake gas flow rate using a correction map that stores a correction value in association with temperature and intake gas flow rate.

Solution to Problem

In order to solve the above problem, a gas flow rate measurement device of the present invention includes:

a flow rate detection element configured to detect a flow rate in a state of having an effect of an environment temperature;

a temperature detection unit configured to detect an environment temperature;

a storage unit configured to be set on a correction map formed of a vertical axis and a horizontal axis in which either one of the vertical axis and the horizontal axis is an input flow rate axis and the other is an input temperature axis, the storage unit storing a correction amount of a flow rate detection signal detected by the flow rate detection element; and a correction arithmetic unit configured to correct the flow rate detection signal using the correction amount stored in the storage unit, in which the correction amount is a correction amount in which an acquisition point is at a position displaced from a grid point of an orthogonal grid in which a plurality of vertical grids and a plurality of horizontal grids, which are mutually orthogonal, are arranged in a direction of the horizontal axis and in a direction of the vertical axis, respectively, on the correction map, the storage unit stores positional information of the acquisition point on the correction map, and the correction arithmetic unit, at a time of flow rate measurement, determines a reference input flow rate that refers to the correction map on a basis of the positional information from a flow rate detection signal detected by the flow rate detection element, determines a reference input temperature that refers to the correction map on a basis of the positional information from a temperature detection signal detected by the temperature detection unit, and determines a correction amount corresponding to an input flow rate of the input flow rate axis corresponding to the reference input flow rate and an input temperature of the input temperature axis corresponding to the reference input temperature.

Advantageous Effects of Invention

According to the present invention, a correction value having a small error with respect to a proper correction amount can be stored on a correction map and the temperature of an intake gas flow rate can be corrected with high accuracy.

DESCRIPTION OF EMBODIMENTS

Embodiments of a thermal flow rate measurement device (gas flow rate measurement device) according to the present invention are described below with reference to the drawings.

Example 1

The first example of the present invention is described in conjunction with FIGS. 1 to 5B.

Figure 1:
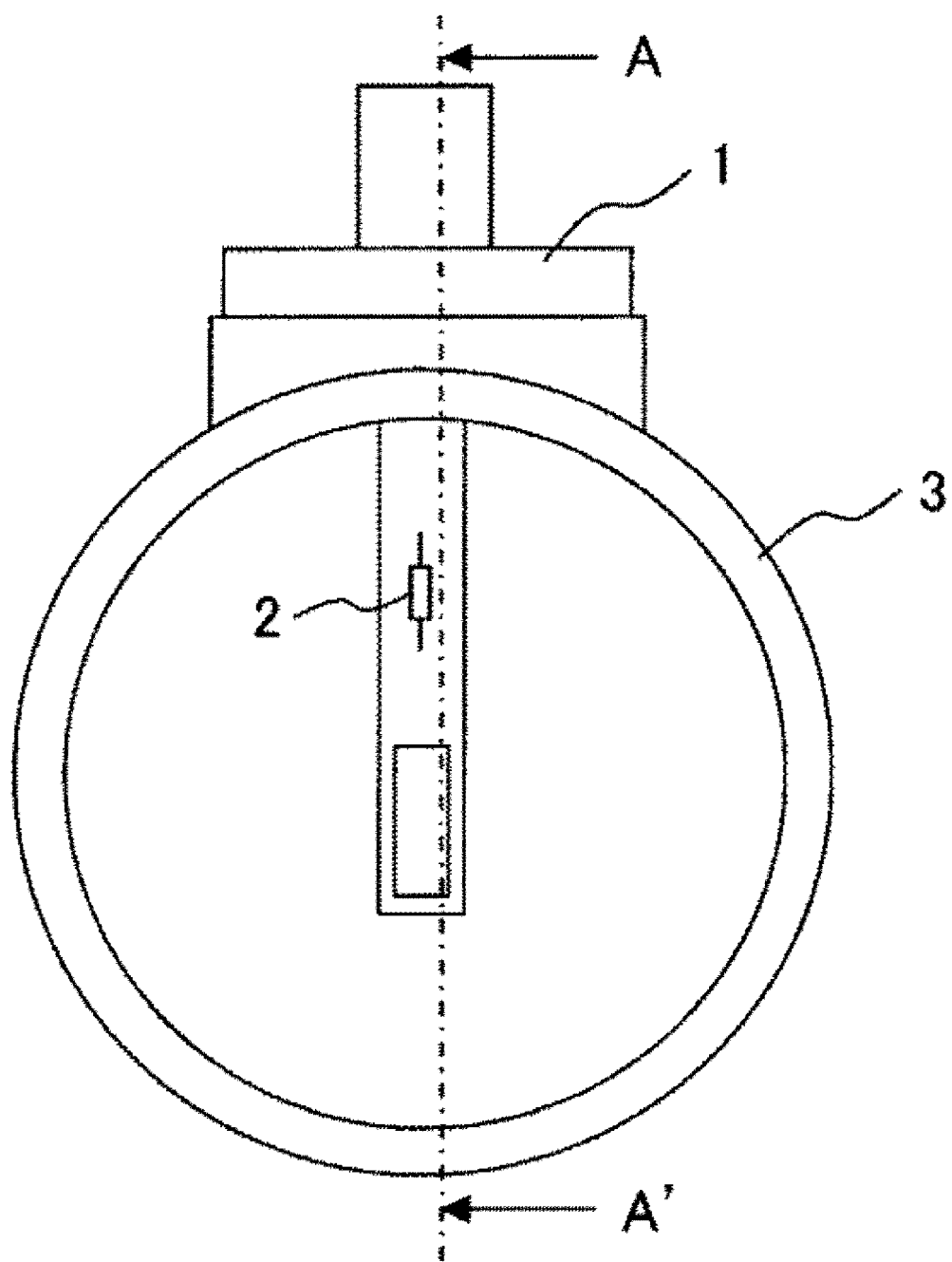
FIG. 1 is a view of a thermal flow rate measurement device of the present invention attached to a gas passage body.

FIG. 1 is a view of a thermal flow rate measurement device of the present invention attached to a gas passage body.

Figure 2:
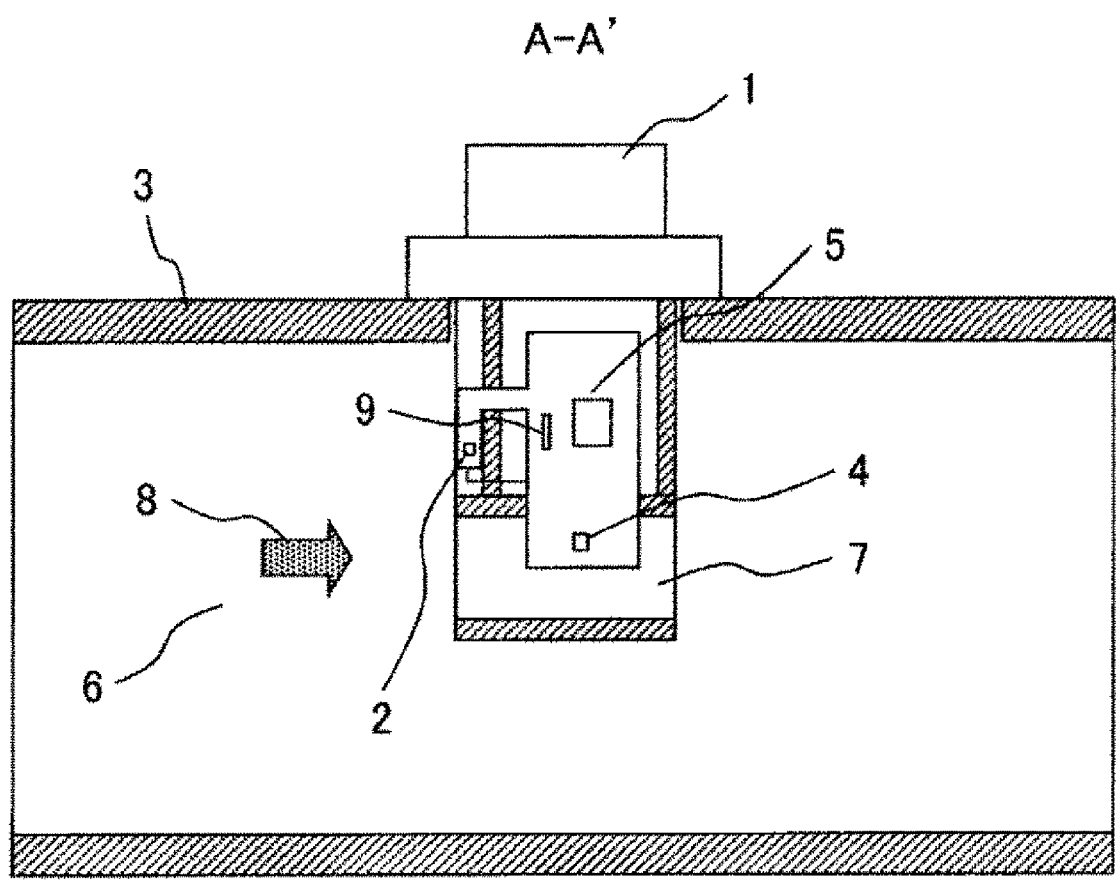
FIG. 2 is a cross-sectional view cut along A-A' of FIG. 1.

FIG. 2 is a cross-sectional view cut along A-A' of FIG. 1. Note that the configuration described in FIGS. 1 and 2 is also used in the second and third examples described below.

A thermal flow rate measurement device 1 is attached to an intake passage body (intake pipe) 3, which forms an intake flow channel of an internal combustion engine, and measures a flow rate of gas (air) 8 that flows in a main passage 6 formed on an inner side of the intake passage body 3. Therefore, the thermal flow rate measurement device 1 is exposed to the gas (air) 8 on an inner side of the intake passage body 3. A substrate 5 is provided inside the thermal flow rate measurement device 1, and a gas temperature detection element 2 is fit to the substrate 5. The gas temperature detection element 2 is fit to an upstream portion of the thermal flow rate measurement device 1 so as to be exposed to intake gas. Note that the gas temperature detection element 2 is also called a thermistor or a gas temperature measurement resistor.

The thermal flow rate measurement device 1 includes a sub-passage 7, and an intake flow rate detection element 4 is arranged inside the sub-passage 7. The intake flow rate detection element 4 may sometimes be called a flow rate detection element 4.

Figure 3:
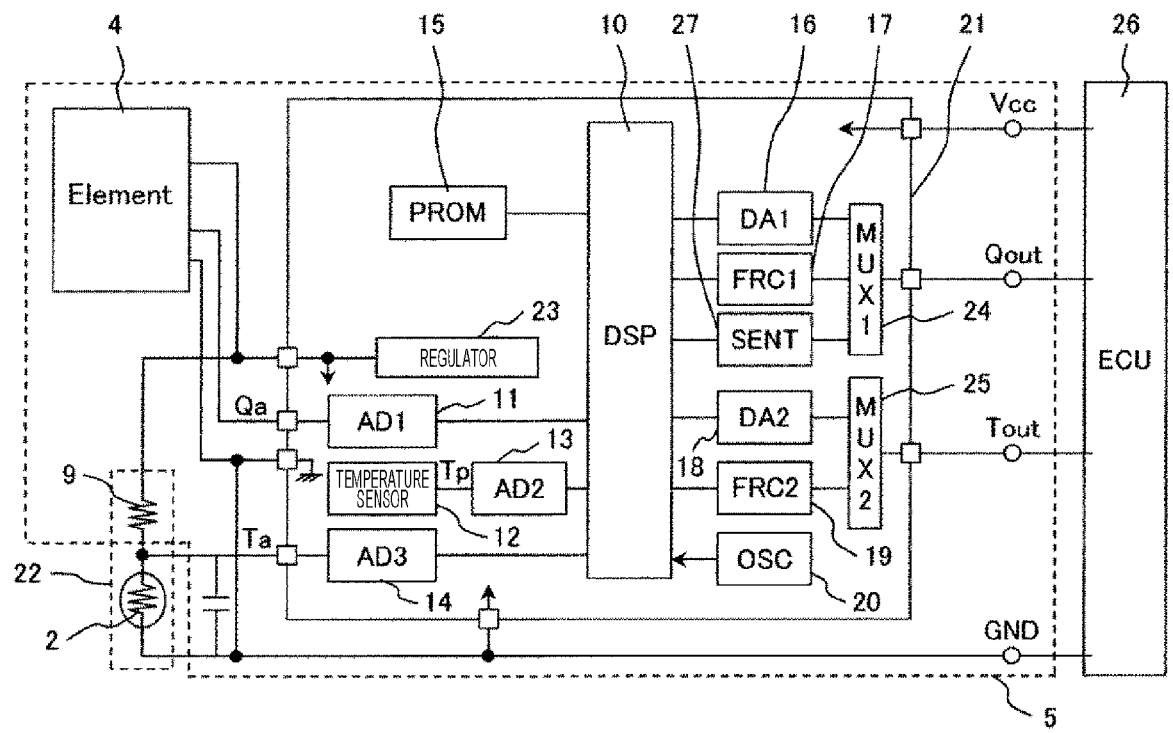
FIG. 3 is a circuit of a thermal flow rate measurement device according to a first example of the present invention (when a substrate is used).

FIG. 3 is a circuit of a thermal flow rate measurement device according to the first example of the present invention (when a substrate is used).

In addition to the gas temperature detection element 2, a stationary resistor 9 and the intake flow rate detection element 4 are fit to the substrate 5. A series circuit of the stationary resistor 9 and the gas temperature detection element 2 forms a gas temperature detection circuit 22. The gas temperature detection circuit 22 is arranged in a position separated from the sub-passage 7. The stationary resistor 9 may directly be mounted on the substrate 5, but may be provided in an integrated circuit 21 provided on the substrate 5. Here, as the integrated circuit 21, an LSI, a microcomputer, or the like is conceivable.

The intake flow rate detection element 4 is an element that detects the flow rate of gas (air) flowing in the sub-passage 7. The thermal flow rate measurement device 1 measures the flow rate of the gas 8 flowing in the main passage 6 on the basis of the flow rate of the gas flowing in the sub-passage 7, which is detected by the intake flow rate detection element 4.

In FIG. 3, the gas temperature detected by the gas temperature detection element 2 is converted into a voltage signal by the gas temperature detection circuit 22 on the substrate 5, and the voltage signal is input to an analog-to-digital converter (AD3) 14. Furthermore, a temperature sensor 12 for detecting the temperature of the substrate 5 is fit in the integrated circuit 21.

The temperature sensor 12 detects the temperature in the integrated circuit 21 to detect the temperature corresponding to the temperature of the substrate 5. Thus, it is possible to detect the gas temperature and the temperature of the thermal flow rate measurement device 1.

The gas temperature detection circuit 22 is configured by a serial connection of the gas temperature detection element 2 arranged to be exposed to the main passage (intake flow channel) 6 and the stationary resistor 9. A constant voltage output from a regulator 23 is fed to the gas temperature detection circuit 22. A divided voltage value of the stationary resistor 9 and the gas temperature detection element 2 is input to a digital signal processing circuit (DSP) 10 via the analog-to-digital converter (AD3) 14. A signal from an oscillator 20 is also input to the digital signal processing circuit (DSP) 10.

The gas temperature detected by the gas temperature detection element 2 and the temperature (substrate temperature) of the substrate 5 detected by the temperature sensor 12 are used as a temperature (environment temperature) of an environment where the intake flow rate detection element 4 is arranged. A gas flow rate detection signal Qa detected by the intake flow rate detection element 4 is corrected and used to reduce effects of the environment temperature. That is, the gas temperature detection element 2 and the temperature sensor 12 are used as a temperature detection unit (temperature detection element) for detecting the environment temperature for correcting the gas flow rate detection signal Qa. As such a temperature detection unit, a temperature sensor other than the gas temperature detection element 2 and the temperature sensor 12 may be provided.

The gas flow rate detection signal Qa detected by the intake flow rate detection element 4 and a gas temperature detection signal Ta detected by the gas temperature detection element 2 are corrected by the digital signal processing circuit (DSP) 10.

This correction is performed using a correction map on the basis of a plurality of digital values, such as a digital value obtained by converting the gas flow rate detection signal Qa from the intake flow rate detection element 4 by an analog-to-digital converter (AD1) 11, a digital value obtained by converting a substrate temperature detection signal Tp from the temperature sensor in the integrated circuit 21 by an analog-to-digital converter (AD2) 13, and a digital value obtained by converting a gas temperature detection signal Ta from the gas temperature detection element 2 (gas temperature detection circuit 22) by an analog-to-digital converter (AD3) 14. The correction map is hereinafter simply called the map in the description. Correction using the map will be described in detail later.

Here, signals are defined in the manner described below. A corrected gas flow rate signal is called a gas flow rate correction signal. Similarly, a corrected gas temperature signal is called a gas temperature correction signal, and a corrected substrate temperature detection signal Tp is called a substrate temperature correction signal. The detected gas flow rate detection signal Qa and the corrected gas flow rate correction signal Qaout are called the gas flow rate signal in the description when they are not particularly needed to be distinguished. In addition, the detected gas temperature detection signal Ta and the corrected gas temperature correction signal are called the gas temperature signal in the description when they are not particularly needed to be distinguished, and the substrate temperature detection signal Tp and the corrected substrate temperature correction signal are called the substrate temperature signal when they are not particularly needed to be distinguished.

The digital values of the gas flow rate correction signal and the gas temperature correction signal are analog-converted by a digital-to-analog converter (DA1) 16 and a digital-to-analog converter (DA2) 18, and output as voltage signals. Meanwhile, when the digital value of the gas flow rate correction signal is analog-converted using a free-running counter (FRC1) 17, it is output as a frequency signal. Similarly, when the digital value of the gas temperature correction signal is analog-converted using a free-running counter (FRC2) 19, it is output as a frequency signal. Furthermore, the gas flow rate correction signal and the gas temperature correction signal are output as a composite signal as a SENT signal using a SENT signal generator 27. Here, SENT is a digital communication method specified by SAE.

The outputs of the digital-to-analog converters 16 and 18, the free-running counters 17 and 19, and the SENT generator 27 are selected by setting of a multiplexer (MUX1) 24 and a multiplexer (MUX2) 25, and output as an output signal Qout of the gas flow rate signal and an output signal Tout of the gas temperature signal. The settings of the multiplexers can be switched by a constant in a PROM 15. Furthermore, the thermal flow rate measurement device 1 is electrically connected to an ECU 26, and sends the output signal Qout of the gas flow rate signal and the output signal Tout of the gas temperature signal to the ECU 26. In addition, the thermal flow rate measurement device 1 receives power Vcc and ground power GND fed from the ECU 26.

The aforementioned integrated circuit 21 forms a correction arithmetic unit (correction arithmetic circuit) for correcting the intake flow rate (gas flow rate detection signal Qa). Note that the correction arithmetic unit may sometimes be called the correction unit in the description.

Figure 4:
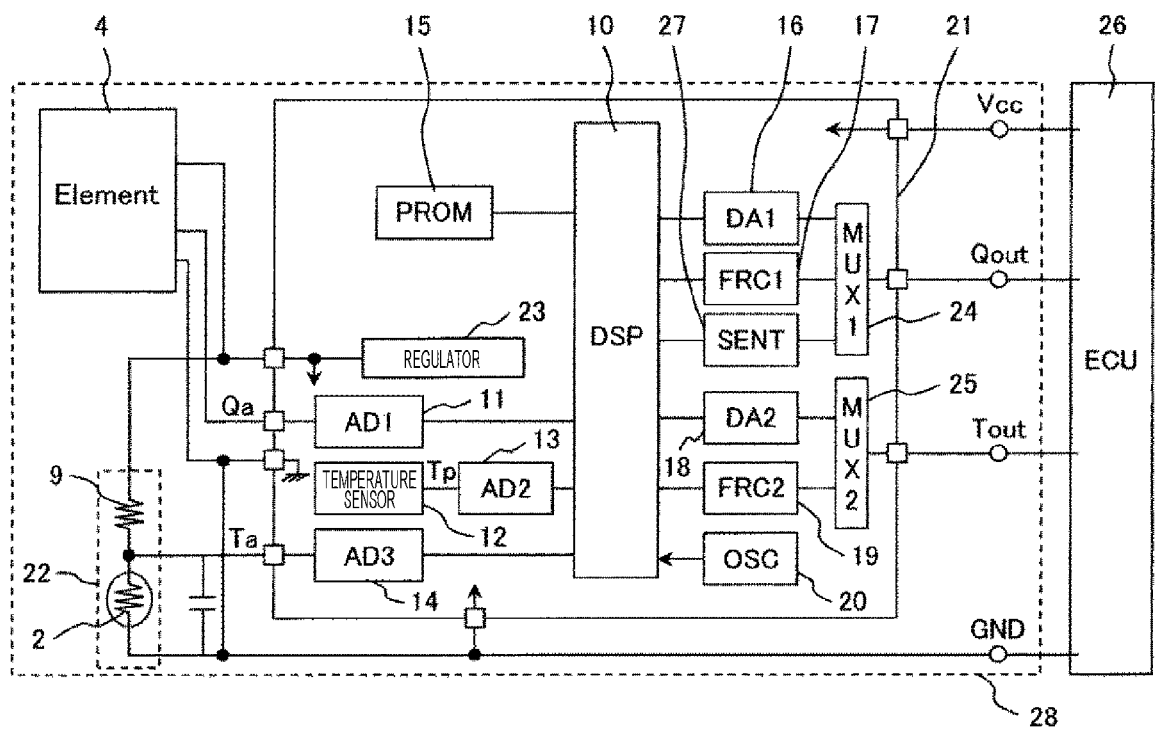
FIG. 4 is a circuit of a thermal flow rate measurement device according to the first example of the present invention (when a chip package is used).

FIG. 4 is a circuit of a thermal flow rate measurement device according to the first example of the present invention (when a chip package is used).

FIG. 3 describes an example in which the gas temperature detection circuit 22 is provided on the substrate 5. However, as illustrated in FIG. 4, it may be formed of a chip package 28 in which the gas temperature detection circuit 22 and the intake flow rate detection element 4 are packaged with resin.

Next, a method of correcting the gas flow rate signal using the gas temperature signal is described.

In the present example, the map is used to correct the gas flow rate signal. The map is that in which the normalized gas flow rate signal and the correction constant with respect to the gas temperature signal are arranged in a grid pattern. A method of calculating a correction value of the gas flow rate signal depending on the gas flow rate signal and the gas temperature signal using the map is called the map correction.

Figure 5A:
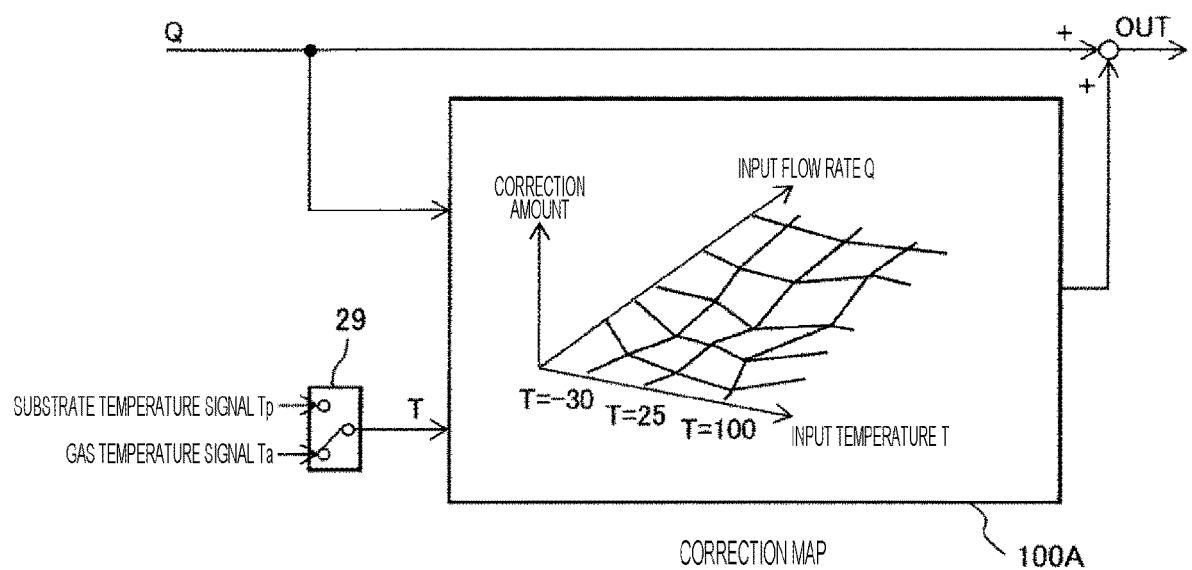
FIG. 5A is a correction logic diagram of an intake gas flow rate signal according to the first example of the present invention.

FIG. 5A is a correction logic diagram of an intake gas flow rate signal according to the first example of the present invention.

In the present example, when correction is performed using the signals obtained by converting the gas flow rate detection signal Qa, the substrate temperature detection signal Tp, the gas temperature detection signal Ta into digital values, with regard to a temperature signal used for correction, a switch 29 for selecting either the substrate temperature detection signal Tp or the gas temperature detection signal Ta is provided. The switch 29 can be switched by a constant in the PROM (PROM is a nonvolatile memory, e.g., an EPROM, EEPROM, or flash) 15. In addition, in the map, grid points are arranged with respect to each of given temperatures, and a correction constant (correction amount) corresponding to temperature T and flow rate Q of each grid point is stored on the grid points. When the temperature T indicated by the gas temperature detection signal Ta and the substrate temperature detection signal Tp and the flow rate Q indicated by the gas flow rate detection signal Qa are present between grid points, the correction constant is calculated by linear interpolation between the grid points, and the gas flow rate detection signal Qa is corrected using the calculated correction constant. Thus, it is possible to correct a wide range of temperature.

Figure 12A:
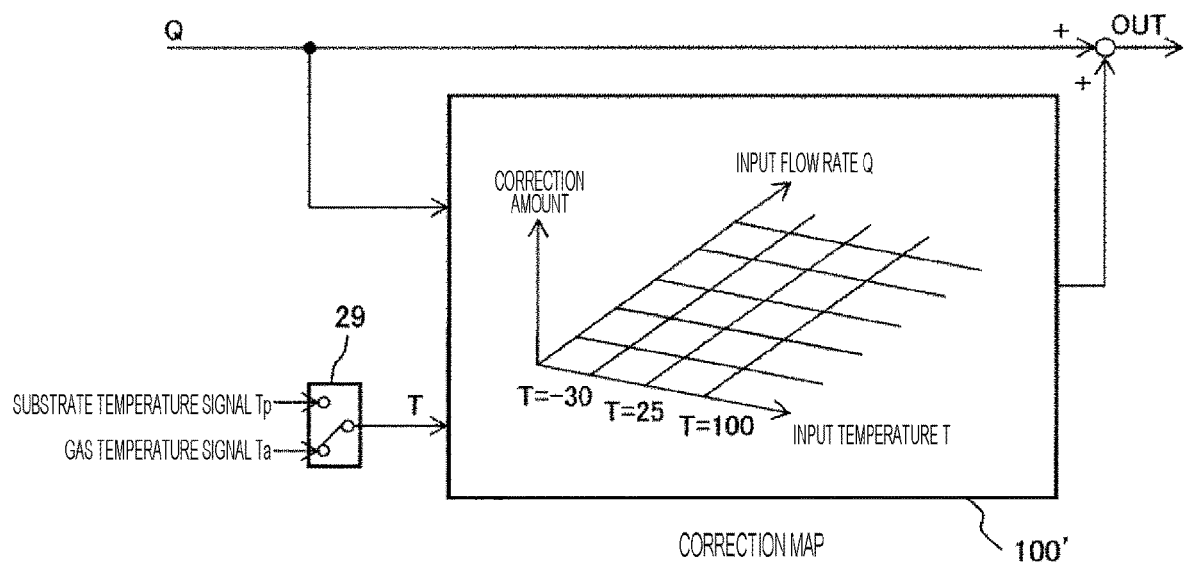
FIG. 12A is a correction logic diagram of an intake gas flow rate signal when a two-dimensional map formed of an orthogonal grid is used.
Figure 12B:
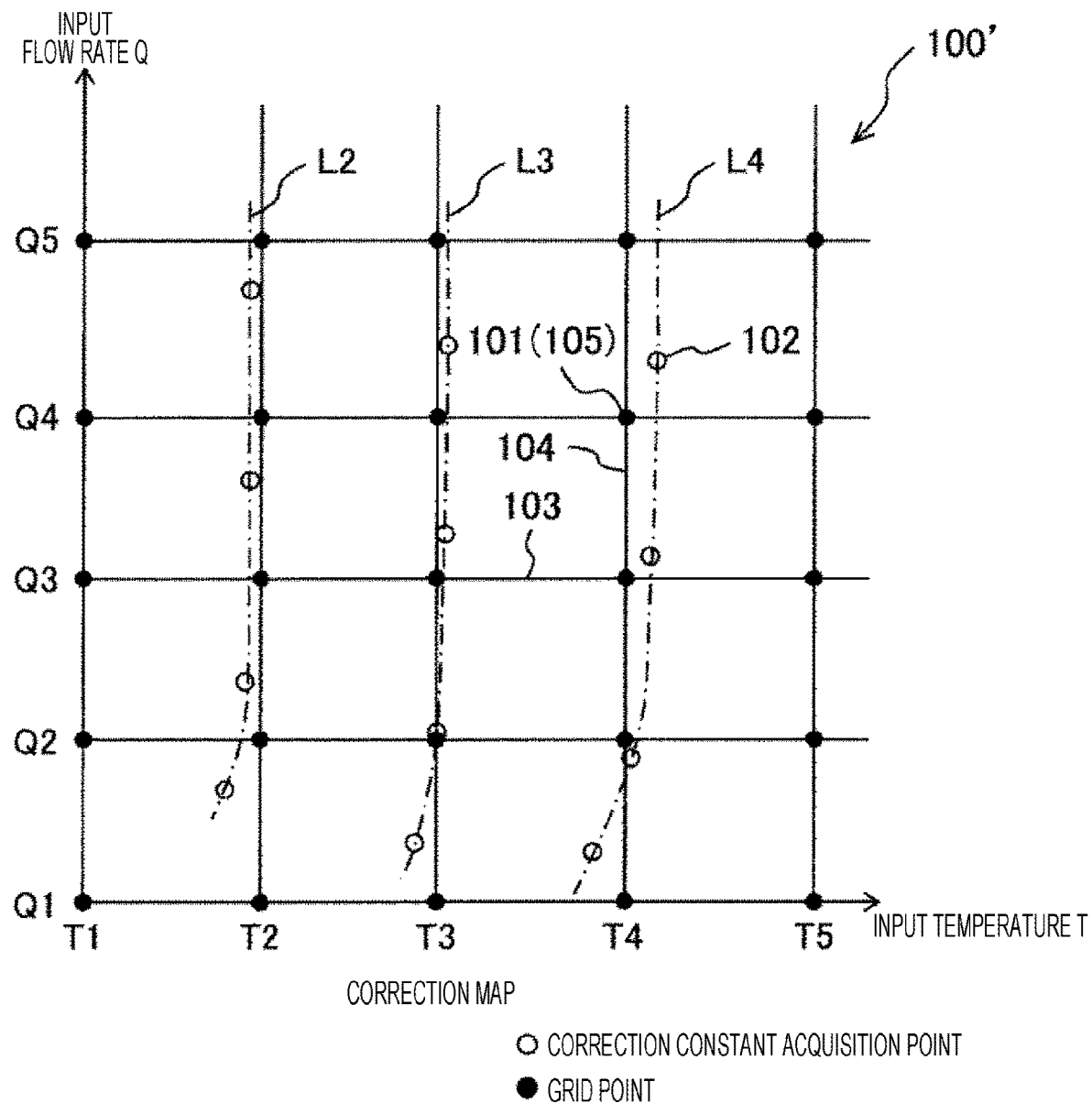
FIG. 12B is a data arrangement diagram in a map on the basis of the logic of FIG. 12A.

As described in "Technical Problem", a general map is a two-dimensional map formed of an orthogonal grid on which grid points are arranged at regular intervals. The two-dimensional map formed of an orthogonal grid is described in conjunction with FIGS. 12A and 12B. FIG. 12A is a correction logic diagram of an intake gas flow rate signal when a two-dimensional map formed of an orthogonal grid is used. FIG. 12B is a data arrangement diagram in a map on the basis of the logic of FIG. 12A.

As described above, as the temperature signal, the gas temperature detection signal Ta from the gas temperature detection element 2 or the substrate temperature detection signal Tp from the temperature sensor 12 may be used. An example in which the gas temperature detection signal Ta from the gas temperature detection element 2 is used as the temperature signal is described below. When the substrate temperature detection signal Tp is used, the example of the present invention can be carried out by replacing the gas temperature detection signal Ta described below with the substrate temperature detection signal Tp.

In a map 100', an intersection between the normalized gas flow rate signal (input flow rate Q) and gas temperature signal (input temperature T) is called a grid point 101, and a correction constant (correction amount) is given to the grid point 101. That is, the map 100' is formed of an orthogonal grid. Here, the orthogonal grid means a grid in which the grid points 101 are arranged in the vertical axis direction and in the horizontal axis direction in a straight fashion, and a horizontal grid 103 and a vertical grid 104 meet orthogonally to each other. Furthermore, in a general orthogonal grid, the horizontal grids 103 and the vertical grids 104 are arranged at regular intervals in the vertical axis direction and in the horizontal axis direction, respectively, and the grid points 101, which are intersections of both grids 103 and 104, are arranged at regular intervals in the vertical axis direction and in the horizontal axis direction.

The flow rate and the temperature of the correction constant to be obtained in practice are displaced from the grid points 101 as indicated by white circles 102 in FIG. 12B. The white circles 102 indicate correction constant acquisition points (temperature T and flow rate Q) at which the correction constant is acquired. The position (coordinate) on the input temperature axis and input flow rate axis of the white circle on the map are called the acquisition point 102 in the description below.

The amount of displacement of the acquisition point 102 from the grid point 101 varies in the horizontal axis (input temperature axis) direction and in the vertical axis (input flow rate axis) direction depending on temperature. Therefore, for example, the acquisition points 102 at a normal temperature of 25° C. (T3) are arranged on a dashed dotted line L3. Even when resolution (intervals) of the grid points 101 is optimally set to be close to the grid points 101 of the map 100', in the case of other temperatures T2 and T4, the acquisition points 102 arranged on dashed dotted lines L2 and L4 are largely displaced from the grid points 101 on the temperatures T2 and T4. In light of the above, it is found that the resolution (grid point intervals) of the grid optimal for each acquisition point 102 in the input temperature axis direction and in the input flow rate axis direction varies with temperature and is not the same at each temperature.

When the acquisition point 102 is displaced from the grid point 101, linear interpolation is performed on the acquisition point 102 near the grid point 101 to calculate a correction constant of the grid point 101. In this case, the calculated correction constant possibly includes a large error.

Figure 13:
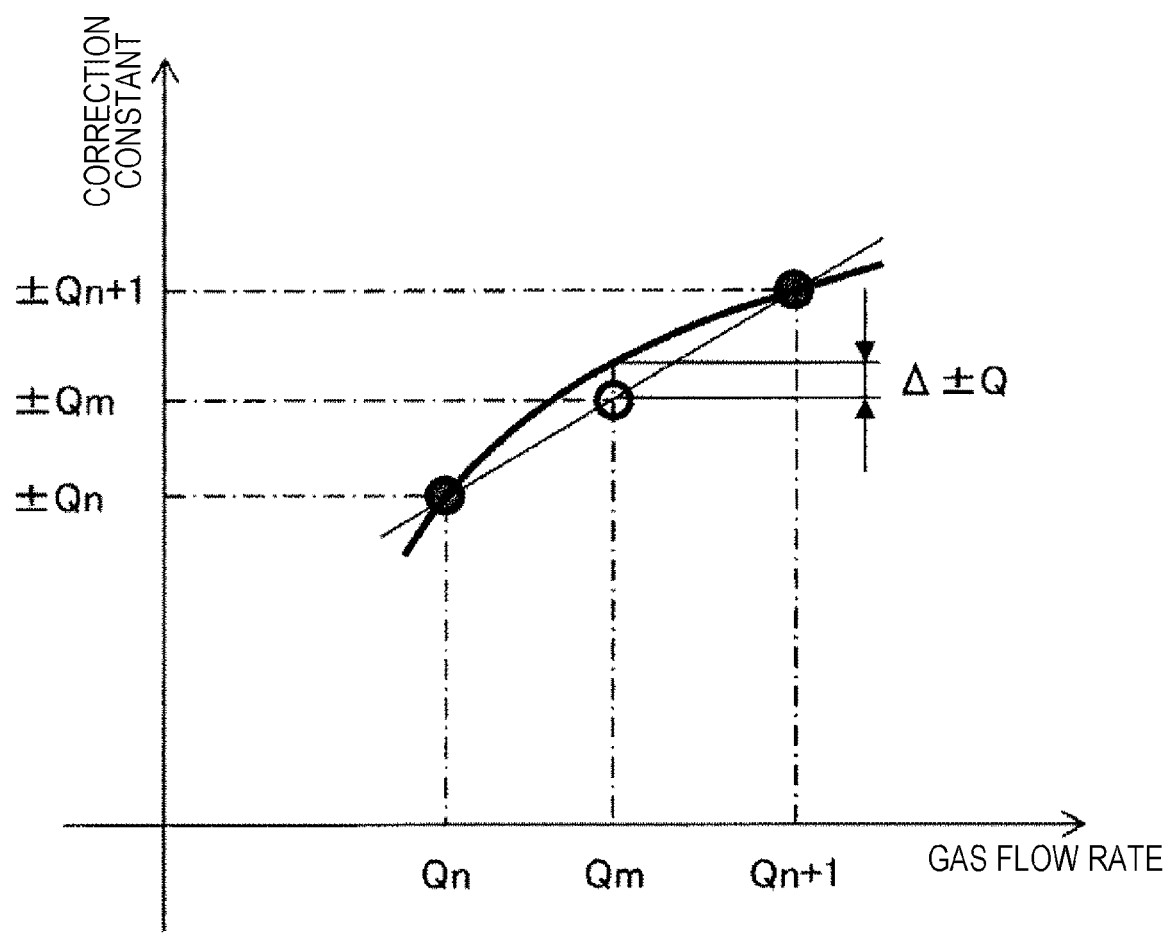
FIG. 13 is a conceptual graph of a linear interpolation of calculating a correction constant of grid points from two input points near grid points.

FIG. 13 is a conceptual graph of a linear interpolation of calculating a correction constant of grid points from two input points near grid points.

As illustrated in FIG. 13, correction constant (correction amount) ±Q varies by drawing a curve relative to gas flow rate. Therefore, when linear interpolation is performed for the correction constant for the gas flow rate Qm of the grid point 101 using gas flow rates Qn and Qn+1 of two adjacent acquisition points 102, an error (interpolation error) Δ±Q occurs in the correction constant set at the grid point 101. Therefore, when the grid point 101 of the map 100' formed of an orthogonal grid is set to a setting point (storage point) 105 of the correction constant, an interpolation error that restricts high accuracy of correction can occur in the correction constant stored in the map. As a result, an error that restricts high accuracy of detection accuracy occurs in the gas flow rate correction signal, and high accuracy of the intake gas flow rate measured by the thermal flow rate measurement device 1 is limited.

Figure 5B:
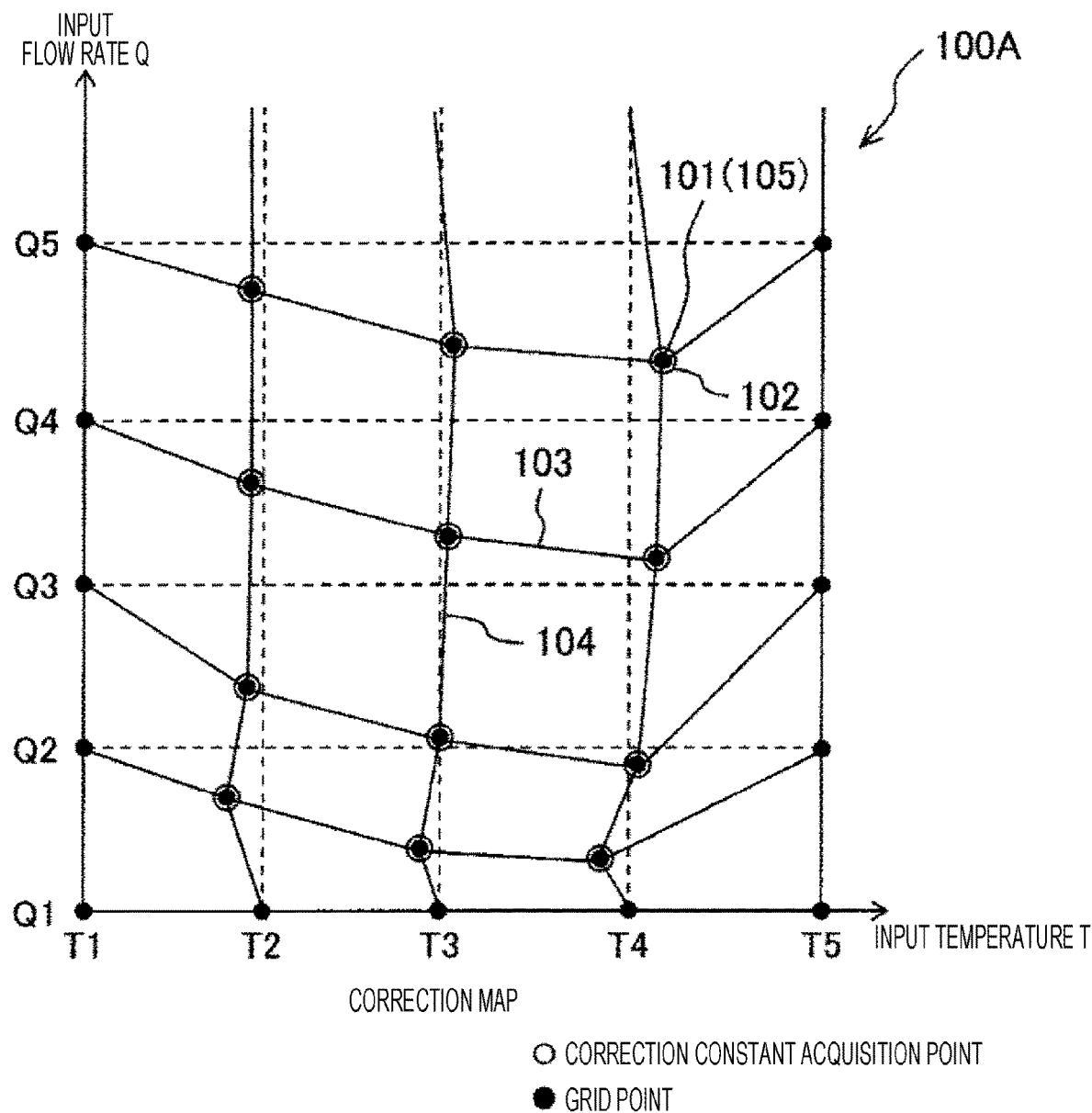
FIG. 5B is a data arrangement diagram in a map on the basis of the logic of the first example.

Therefore, in the present example, a map 100A illustrated in FIG. 5B is used. FIG. 5B is a data arrangement diagram in a map on the basis of the logic of the first example.

The map 100A is formed of a distortion grid such that the resolution of grids is optimized relative to the correction constant obtained. Therefore, the acquisition point 102 can correspond to the grid point 101, and the correction constant of the acquisition point 102 is stored in the map 100A as it is. That is, the acquisition point 102 becomes a setting point (storage point) 105 of the correction constant. Therefore, the correction constant free of an interpolation error can be stored in the map A. That is, the resolution of grids is optimized, and the temperature characteristics of the flow rate can be corrected with high accuracy.

The distortion grid means a state in which the grid point 101 is set such that the grid points are at non-uniform intervals in either at least one of the horizontal axis direction and the vertical axis direction of the map 100A. In the present example, the grid point 101 is set such that the grid points 101 are at non-uniform intervals in both the horizontal axis direction and the vertical axis direction. In this case, the grid points 101 are not arranged on a straight line at specific temperatures T (T1, T2, T3, T4, T5), and the grid points 101 arranged in the vertical axis direction are at non-uniform intervals. In addition, the grid points 101 are not arranged on a straight line at specific input flow rates Q (Q1, Q2, Q3, Q4, Q5), and the grid points 101 arranged in the horizontal axis direction are at non-uniform intervals. That is, the vertical grid 103 and the horizontal grid 104 are not straight, but have a line chart shape.

In the case of a distortion grid, it is necessary to store the position of each grid point 101 on the map 100A. Therefore, the values of input temperature T and input flow rate Q of each grid point 101 of FIG. 5B are stored in the PROM (or EPROM) 15. The values of the input temperature T and the input flow rate Q of each grid point 101 can be assumed to be coordinate values of an orthogonal coordinate system in which the input temperature T is plotted on the horizontal axis (vertical axis) and the input flow rate Q is plotted on the vertical axis (horizontal axis). As described above, in the present example, in order to use the distortion grid, the positional information of the grid point 101 (acquisition point 102) on the map 100A is stored.

In the present example, the positional information to be stored includes an input flow rate value of the correction constant setting point 105 on the input flow rate Q axis and an input temperature value of the correction constant setting point 105 on the input temperature T axis. Here, the input flow rate value and the input temperature value of the correction constant setting point 105 are not limited to an input flow rate value and an input temperature value, but include values corresponding to the input flow rate value and the input temperature value or values equivalent to the input flow rate value and the input temperature value.

Next, an operation of correcting the gas flow rate detection signal Qa is described.

When the gas flow rate detection signal Qa is corrected on the basis of the gas temperature detection signal Ta measured while the engine is running, the map 100A is referred to such that the gas temperature detection signal Ta detected is assumed to be the input temperature T and the gas flow rate detection signal Qa is assumed to be the input flow rate Q. In this case, the gas flow rate detection signal Qa and the gas temperature detection signal Ta are respectively used as a reference input flow rate Q and a reference input temperature T that refer to the map 100A.

The position on the map specified by the gas temperature detection signal Ta and the gas flow rate detection signal Qa measured while the engine is running is hereinafter called an actual measurement point.

When the gas temperature detection signal Ta and the gas flow rate detection signal Qa do not correspond to the input temperature T and the input flow rate Q of the grid point 101, linear interpolation is performed on the plurality of grid points 101 present near the actual measurement point in the digital signal processing circuit (DSP) 10 to calculate a correction constant corresponding to the gas temperature detection signal Ta and the gas flow rate detection signal Qa of the actual measurement point. Then, the gas flow rate detection signal Qa is corrected on the basis of the calculated correction constant.

In the present example, the map 100A that stores the correction constant has a feature such that a conventionally known operation (method) can be adopted for a specific operation (method) for correcting the gas flow rate detection signal Qa using the correction constant stored in the map 100A.

In the present example, an error due to linear interpolation occurs when the correction constant of the actual measurement point is calculated. However, because a highly accurate correction constant is given to the grid point 101, it is possible to calculate a highly accurate correction constant corresponding to the gas temperature detection signal Ta and the gas flow rate detection signal Qa.

Note that the method of interpolation in calculating the correction constant of the actual measurement point is not limited to linear interpolation. The correction constant may be determined by interpolation between the plurality of grid points 101 by an interpolation method other than the linear interpolation.

Example 2

Next, the second example is described in conjunction with FIGS. 6A, 6B, 7 and 8. The same configurations as those of the first example are designated by the same reference symbols and will not be elaborated.

Figure 6A:
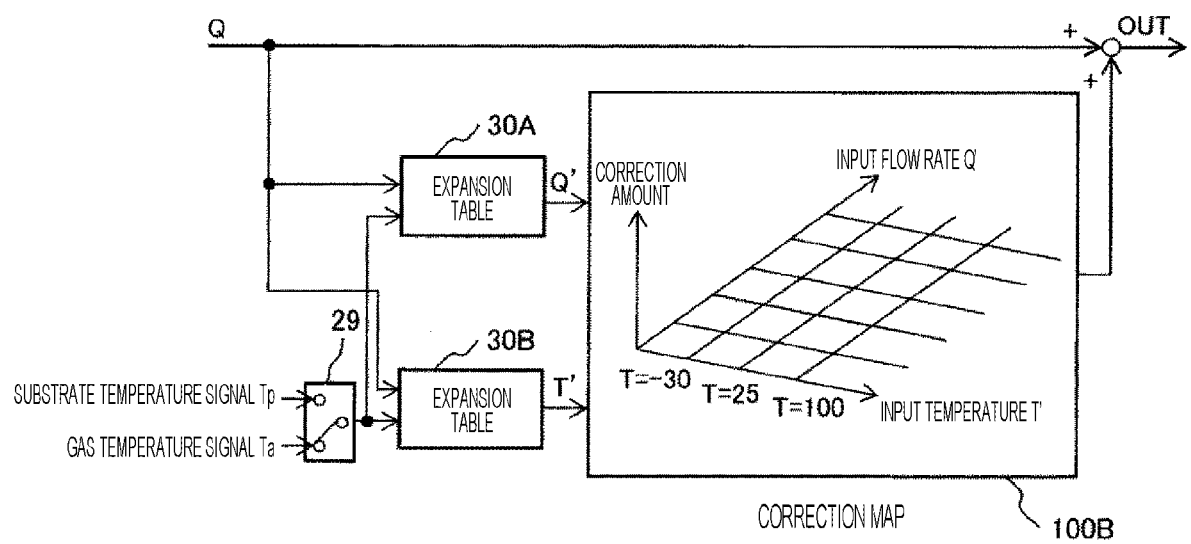
FIG. 6A is a correction logic diagram of an intake gas flow rate signal according to a second example of the present invention.
Figure 6B:
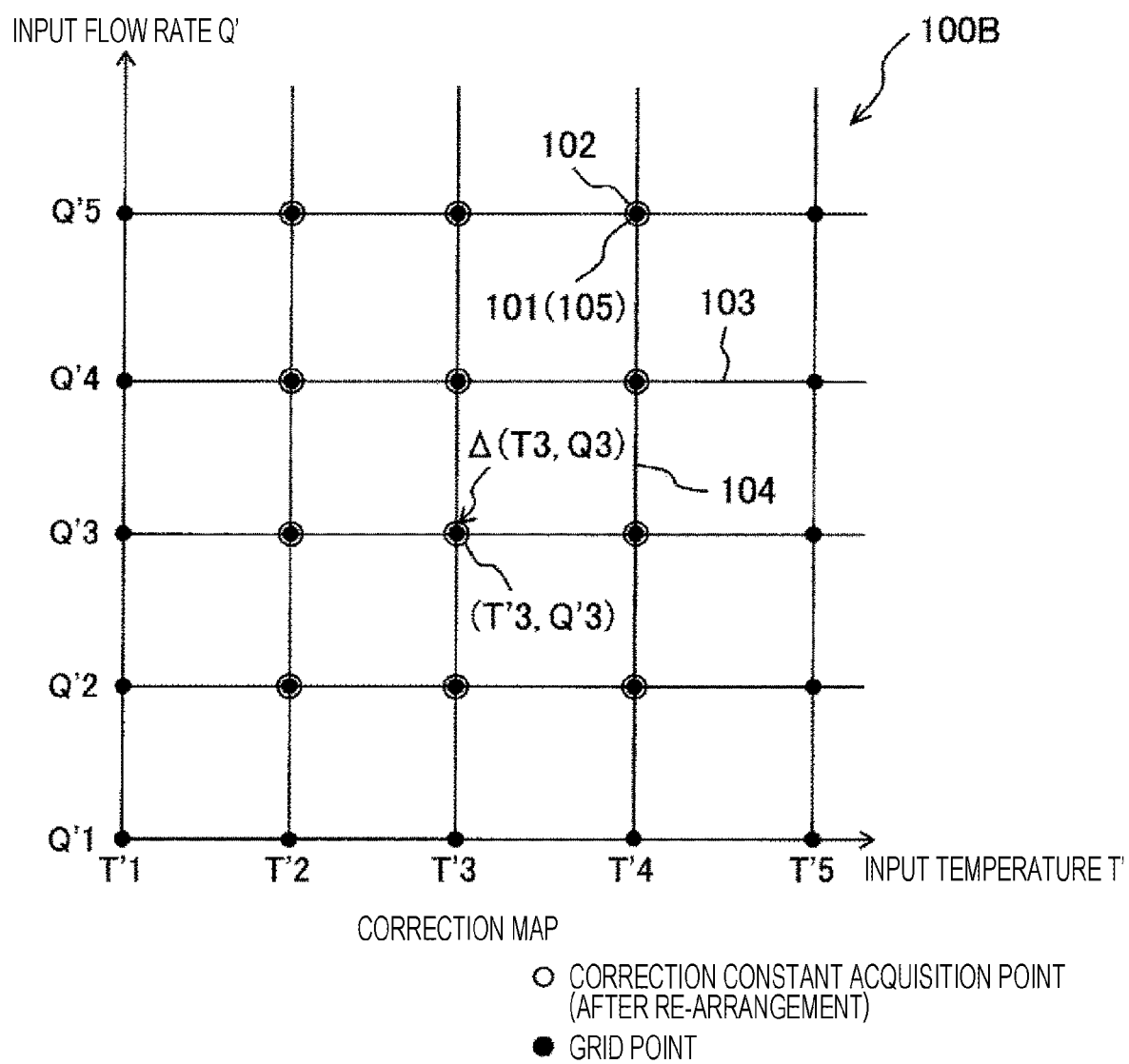
FIG. 6B is a data arrangement diagram in a map on the basis of the logic of the second example.

FIG. 6A is a correction logic diagram of an intake gas flow rate signal according to the second example of the present invention. FIG. 6B is a data arrangement diagram in a map on the basis of the logic of the second example.

The first example indicates an example in which the grid points 101 are arranged at ideal positions (positions corresponding to the acquisition points 102). In the second example, the acquisition points 102 described in the first example are expanded, and the correction constant of the acquisition points 102 is set as a correction constant for the grid points 101 of the orthogonal grid (103, 104). That is, as indicated by a map 100B of FIG. 6B, the position of the acquisition point 102 is displaced such that the acquisition point 102 corresponds to the grid point 101 of the orthogonal grid, and the correction constant (correction amount) of the acquisition point 102 is stored (set) at the grid point 101. Thus, the position of the acquisition point 102 is converted to correspond to the position of the grid point 101 of the orthogonal grid, and the acquisition point 102 is re-arranged such that the position of the acquisition point 102 corresponds to the position of the grid point 101 of the orthogonal grid.

In the present example, the grid point 101 of the orthogonal grid (103, 104) becomes the setting point (storage point) of the correction constant. Note that the orthogonal grid (103, 104) of the present example and Example 3 to be described below is a grid in which the grid points 101 are arranged on a straight line in the vertical axis direction and in the horizontal axis direction, and includes not only a grid in which the plurality of grids 103 and 104 is arranged at regular intervals, but also a grid in which they are arranged at irregular intervals.

Figure 7:
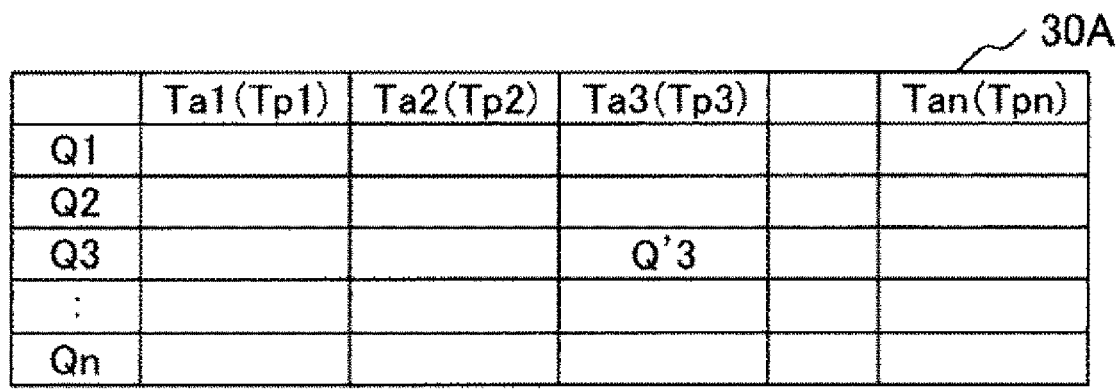
FIG. 7 is an expansion map of a flow rate signal on the basis of the logic of the second example.
Figure 8:
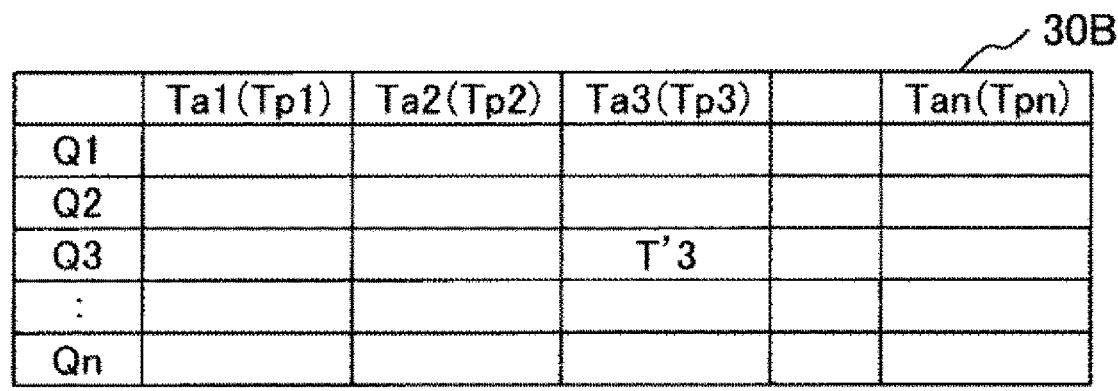
FIG. 8 is an expansion map of a temperature signal on the basis of the logic of the second example.

Re-arrangement of the acquisition point 102 is described in conjunction with FIGS. 7 and 8. FIG. 7 is an expansion map of a flow rate signal on the basis of the logic of the second example. FIG. 8 is an expansion map of a temperature signal on the basis of the logic of the second example.

The present example includes an expansion table 30A (FIG. 7) and an expansion table 30B (FIG. 8), and the acquisition point 102 is re-arranged such that the position of the acquisition point 102 corresponds to the position of the grid point 101 of the orthogonal grid. The expansion table 30A is a table that associates the input temperature T (T1, T2, T3, . . . , Tn) and the input flow rate Q (Q1, Q2, Q3, . . . , Qn) of the acquisition point 102 with the input flow rate Q' (Q'1, Q'2, Q'3, . . . , Q'n) of the grid point 101 to which the acquisition point 102 is caused to correspond. The expansion table 30B is a table that associates the input temperature T (T1, T2, T3, . . . , Tn) and the input flow rate Q (Q1, Q2, Q3, . . . , Qn) of the acquisition point 102 with the input temperature T' (T'1, T'2, T'3, . . . , T'n) of the grid point 101 to which the acquisition point 102 is caused to correspond. Note that, as described in the first example, the substrate temperature detection signal Tp may be used in place of the gas temperature detection signal Ta. Therefore, the input temperature T in FIGS. 7 and 8 is described as Ta1 (Tp1), Ta2 (Tp2), Ta3 (Tp3), . . . , Tan (Tpn)).

In the description below, the input flow rate Q' (Q'1, Q'2, Q'3, . . . , Q'n) and the input temperature T' (T'1, T'2, T'3, . . . , T'n) of the re-arranged acquisition point 102 are called a converted input flow rate Q' (Q'1, Q'2, Q'3, . . . , Q'n) and a converted input temperature T' (T'1, T'2, T'3, . . . , T'n). The converted input flow rate Q' (Q'1, Q'2, Q'3, . . . , Q'n) and the converted input temperature T' (T'1, T'2, T'3, . . . , T'n) respectively correspond to the input flow rate and the input temperature of the grid point 101 of the correction map 100B.

The expansion table 30A and the expansion table 30B store information (positional information) indicative of the positional relationship between the grid point 101 and the acquisition point 102 on the map 100B. That is, the positional information stored on the expansion table 30A and the expansion table 30B is positional information that associates the acquisition point 102 with the grid point 101, which is re-arranged.

The map 100B of the present example is formed of an orthogonal grid with reference to the grid point 101. Meanwhile, with reference to the acquisition point 102, in order for the acquisition point 102 to correspond to the grid point 101, the horizontal axis (input temperature T axis) and the vertical axis (input flow rate Q axis) are expanded to correspond to each acquisition point 102. Accordingly, the plurality of acquisition points 102 arranged in a row on a straight line of the specific input temperature T has mutually different input temperatures in practice. In addition, the plurality of acquisition points 102 arranged in a row on a straight line of the specific input flow rate Q has mutually different input flow rates in practice. That is, the acquisition point 102 is set to correspond to the distortion grid point of the distortion grid. The distortion grid point is expanded to be converted into an orthogonal grid such that the distortion grid point corresponds to the orthogonal grid point, such that the acquisition point 102 is re-arranged at an orthogonal grid point of an orthogonal grid. This means that, with reference to the acquisition point 102, the fact remains that the map 100B is formed of a distortion grid.

Next, an operation of correcting the gas flow rate detection signal Qa is described.

When the gas flow rate detection signal Qa is corrected on the basis of the gas temperature detection signal Ta measured while the engine is running, the map 100B is referred to such that the gas temperature detection signal Ta detected is assumed to be the input temperature T and the gas flow rate detection signal Qa is assumed to be the input flow rate Q after the input temperature T and the input flow rate Q are converted to reference values that refer to the map 100B. The input temperature T and the input flow rate Q converted to refer to the map 100B are called the reference input temperature T and the reference input flow rate Q, respectively.

Therefore, in the present example, the expansion table 30A illustrated in FIG. 7 is provided to expand an input signal Q of the flow rate (digital value of the gas flow rate detection signal Qa) immediately before the correction map 100B. Thus, the expansion table 30A is referred to before the correction map 100B is referred to, and the input signal Q (digital value of the gas flow rate detection signal Qa) measured while the engine is running is converted into the reference input flow rate Q'. In addition, the expansion table 30B illustrated in FIG. 8 is provided to expand an input signal T (digital value of the gas temperature detection signal Ta) of the temperature immediately before the correction map 100B. Thus, the expansion table 30B is referred to before the correction map 100B is referred to, and the input signal T is converted into the reference input temperature T'. Next, the map 100B is referred to using the reference input flow rate Q' and the reference input temperature T' to determine the correction constant.

In the present example, when the gas temperature detection signal Ta measured while the engine is running does not correspond to the input temperature T of the acquisition point 102, linear interpolation is carried out on the input temperatures T of two acquisition points 102 present near the gas temperature detection signal Ta to calculate the reference input temperature T' in the digital signal processing circuit (DSP) 10. Similarly, when the gas flow rate detection signal Qa measured while the engine is running does not correspond to the input flow rate Q of the acquisition point 102, linear interpolation is carried out on the input flow rates Q of two acquisition points 102 present near the gas flow rate detection signal Qa to calculate the reference input flow rate Q' in the digital signal processing circuit (DSP) 10.

In the present example, the reference input flow rate Q' and the reference input temperature T' are converted at the same expansion rate (conversion rate) using the expansion table 30A and the expansion table 30B used to convert the converted input flow rate Q' and the converted input temperature T'.

The correction map 100B is referred to using the reference input flow rate Q' and the reference input temperature T' to calculate the correction constant corresponding to the gas temperature detection signal Ta and the gas flow rate detection signal Qa. Then, the gas flow rate detection signal Qa is corrected on the basis of the calculated correction constant. The operation (method) of determining the correction constant using the correction map 100B and the operation (method) of correcting the gas flow rate detection signal Qa are the same as those of the first example.

In addition, the input signal Q of flow rate input to the expansion table 30A for converting the flow rate signal has temperature-dependent property. Therefore, it is configured such that, when the expansion table 30A is referred to, not only the flow rate signal Q, but also the temperature signal T (Ta) are taken in to ease the temperature-dependent property. The input signal T of temperature input to the expansion table 30B for converting the temperature signal, which is the other signal, has flow rate-dependent property. Therefore, it is configured such that, when the expansion table 30B is referred to, the flow rate signal Q is taken in to ease the flow rate-dependent property.

Note that, as described in the first example, the substrate temperature detection signal Tp may be used in place of the gas temperature detection signal Ta. In addition, an expansion function may be used in place of the expansion table of FIG. 7. In addition, an expansion function may be used in place of the expansion table of FIG. 8.

In the present example, the correction map 100B viewed from the grid point 101 is an orthogonal grid, and it is not necessary to store the positional information (coordinate) of all grid points 101. That is, when the five pieces of positional information Q'1, Q'2, Q'3, Q'4, Q'5 on the vertical axis and the five pieces of positional information T'1, T'2, T'3, T'4, T'5 on the horizontal axis of FIG. 6B are stored, it is possible to specify the positions of 25 (5×5) grid points 101. In addition, the correction constant stored at the grid point is highly accurate data that does not include an interpolation-derived error, and it is possible to obtain the same correction accuracy as that of the first example. Accordingly, in the present example, because it is possible to increase correction accuracy and reduce memory and arithmetic loads, it is possible to obtain the thermal flow rate measurement device 1 that has an arithmetic processing unit having a reduced size and has an increased arithmetic speed.

Example 3

Figures 9, 10:
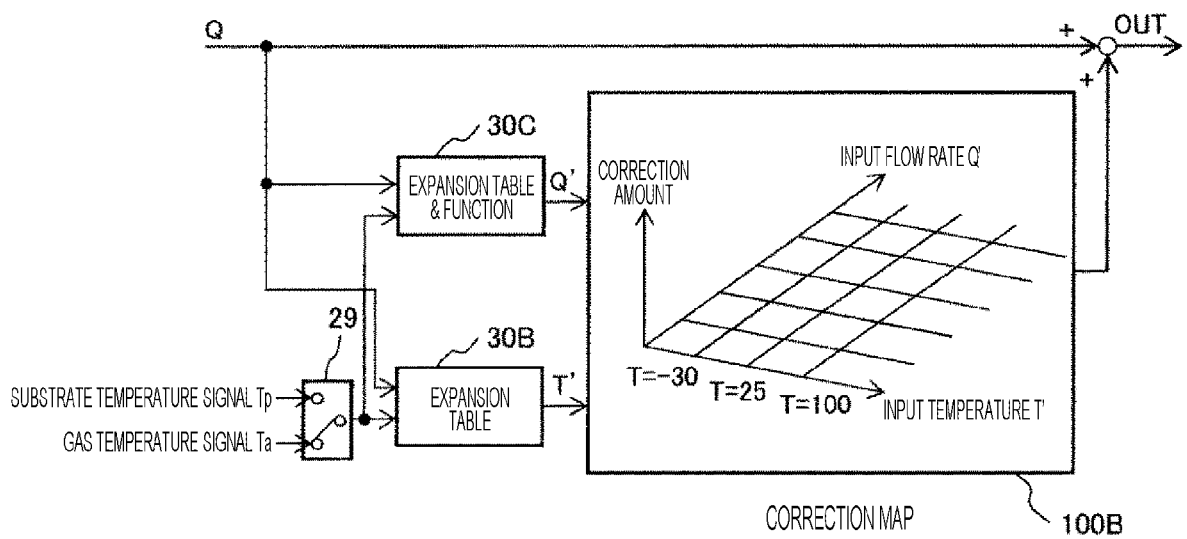
FIG. 9 is a correction logic diagram of an intake gas flow rate signal according to a third example of the present invention.
FIG. 10 is an expansion map of a secondary coefficient on the basis of the logic of the third example.

Next, the third example is described in conjunction with FIGS. 9 and 10. FIG. 9 is a correction logic diagram of an intake gas flow rate signal according to the third example of the present invention. FIG. 10 is an expansion map of a secondary coefficient on the basis of the logic of the third example. The same configurations as those of the first example and the second example are designated by the same reference symbols and will not be elaborated.

In the present example, the expansion table 30A of the second example, provided immediately before the correction map 100B, is changed to a table-function combination 30C. That is, in the present example, the input flow rate Q (Q1, Q2, Q3, . . . , Qn) of the acquisition point 102 is associated with the converted input flow rate Q' (Q'1, Q'2, Q'3, . . . , Q'n) of FIG. 6B using a table 31 illustrated in FIG. 10 and (Formula 1), (Formula 2), and (Formula 3), which will be described later. The configurations and the operations other than the configuration regarding the table-function combination 30C are the same as those of the second example. An operation, which is different from that of the second example, in which the input flow rate Q (Q1, Q2, Q3, . . . , Qn) is associated with the converted input flow rate Q' (Q'1, Q'2, Q'3, . . . , Q'n) using the table 31 and (Formula 1), (Formula 2), and (Formula 3) is described below.

In the present example, the highest degree of Formula 3 associating the input flow rate Q with the converted input flow rate Q' is secondary. In this case, a secondary coefficient is provided as the table 31 illustrated in FIG. 10. Furthermore, coefficients Kb and Kc of each degree are calculated from a secondary coefficient Ka in the manner described below.

$Kb = Ka * a1$ (Formula 1)

$Kc = Ka * a2$ (Formula 2)

where, a1 and a2 are preset constants.

As a method of converting Q, the converted input flow rate Q' is calculated by a formula described below. That is, the gas flow rate detection signal Qa detected by the intake flow rate detection element 4 while the engine is running is converted into the converted input flow rate Q' by Formula 3.

$Q' = Q - (Ka*Tp^2(\text{or } Ta^2) + Kb*Tp(\text{or } Ta) + Kc)$ (Formula 3)

The acquisition point 102 is converted into the grid point 101 of the correction map 100B using the converted input temperature T' converted in the same way as in the second example and the converted input flow rate Q' of the present example.

In the present example, instead of the expansion table 30A of the second example, data of the table 31, the constants a1 and a2, and Formulae 1, 2 and 3 are stored as information indicative of the positional relationship between the grid point 101 and the acquisition point 102 on the map 100B.

Next, an operation of correcting the gas flow rate detection signal Qa is described.

When the gas flow rate detection signal Qa is corrected on the basis of the gas temperature detection signal Ta measured while the engine is running, the table 31 is referred to with the gas flow rate detection signal Qa being assumed to be the input flow rate Q to determine the coefficient Ka corresponding to the input flow rate Q. The coefficients Kb and Kc are calculated from the determined coefficient Ka using Formulae 1 and 2 to calculate the reference input flow rate Q' using Formula 3.

In the present example, when the gas flow rate detection signal Qa measured while the engine is running does not correspond to the input flow rate Q (0, Q1, Q2, Q3, . . . , Qn) of the acquisition point 102, linear interpolation is carried out on the input flow rates Q of two acquisition points 102 present near the gas flow rate detection signal Qa to calculate the coefficient Ka in the digital signal processing circuit (DSP) 10.

The operation (method) of determining the correction constant using the correction map 100B and the operation (method) of correcting the gas flow rate detection signal Qa are the same as those of the first example and the second example.

In the present example, similar to the second example, with reference to the acquisition point 102, the fact remains that the map 100B is formed of a distortion grid.

According to the present example, the number of grid points of the expansion table 31 can be simplified to minimize software capacity and calculation loads to obtain the same effect as the distortion grid. In addition, also in the case of providing a higher degree, i.e., secondary or higher function, only a coefficient of the highest degree is provided on the table, and the other coefficients of degrees are calculated from the highest degree. Thus, the coefficient storage capacity can be reduced.

Note that the gas flow rate detection signal Qa is described in the present example, but the same effect can be obtained even by performing the same conversion on the gas temperature signal Tp or Ta.

Features common to the first example, the second example, and the third example are described below.

First, description is given of an error (hereinafter, an interpolation error) that occurs when a correction constant ±Q'm of the reference input flow rate Q' (the reference input flow rate Q of the first example) is determined by performing linear interpolation between flow rate values Q'n and Q'n+1 of two grid points (hereinafter called the grid point flow rate value).

Figure 14:
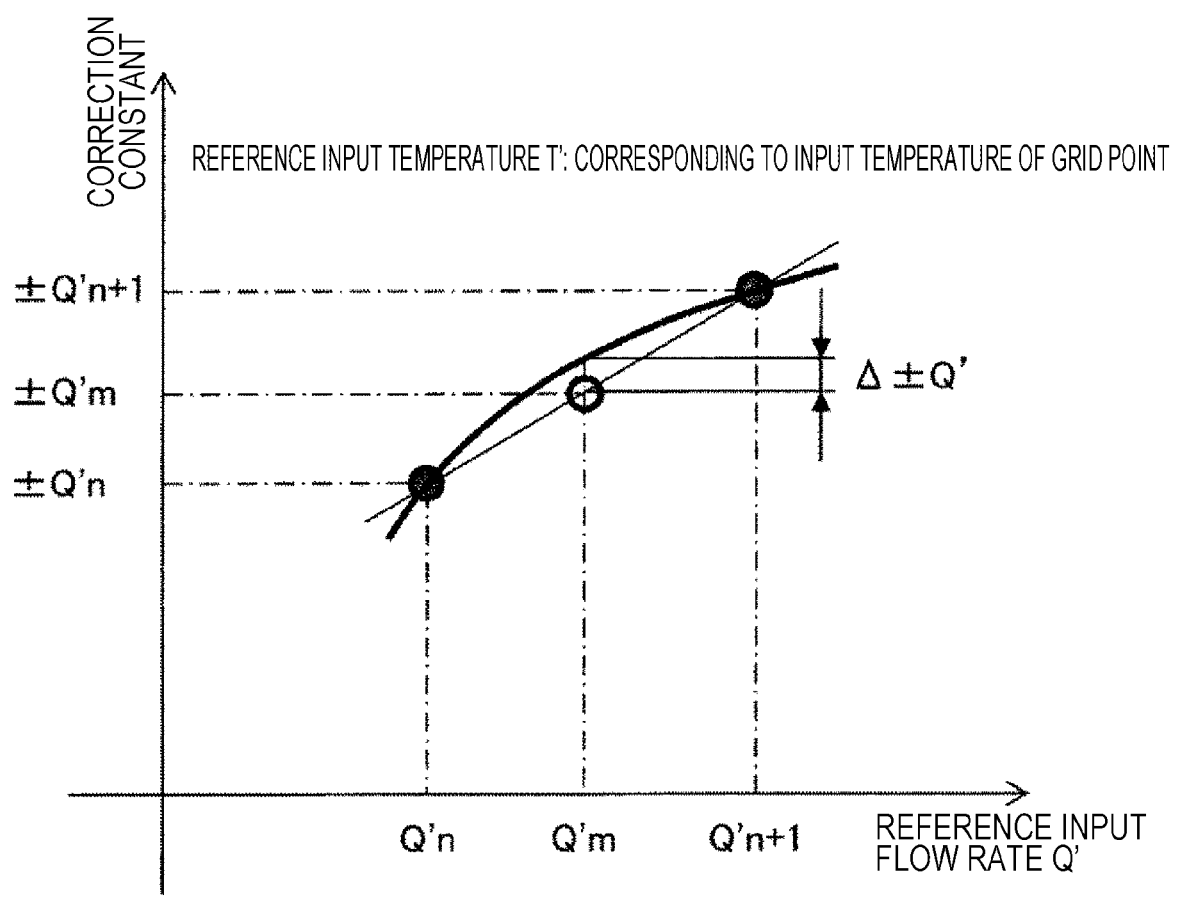
FIG. 14 is a conceptual graph of a linear interpolation of calculating a correction constant of reference input flow rate Q' present between two grid points.

FIG. 14 is a conceptual graph of a linear interpolation of calculating a correction constant of reference input flow rate Q' present between two grid points. Note that, in FIG. 14, the reference input temperature T' is assumed to be corresponding to the input temperature of the grid point. In addition, although the reference input flow rate is indicated by Q in the first example, the reference input flow rate including the reference input flow rate Q of the first example is expressed as the reference input flow rate Q' in FIG. 14.

When a reference value Q'm of the reference input flow rate Q' is present between the two grid point flow rate values (acquisition point flow rate value) Q'n and Q'n+1, linear interpolation is performed between the correction constants ±Q'n and ±Q'n+1 of the two grid point flow rate values Q'n and Q'n+1 to calculate the correction constant ±Q'm. In this case, the calculated correction constant ±Q'm has an error (interpolation error) Δ±Q'. In particular, in the case of the curve of FIG. 14, interpolation error is maximum at a median of the two grid point flow rate values Q'n and Q'n+1. The interpolation error is not always maximized at an median of the two grid point flow rate values Q'n and Q'n+1 depending on the curve of the correction constant. However, the flow rate value at which an interpolation error is maximized is present between the two grid point flow rate values Q'n and Q'n+1 (it does not necessarily indicate the middle), i.e, between two grid points 101 (it does not necessarily indicate the middle).

Figure 11:
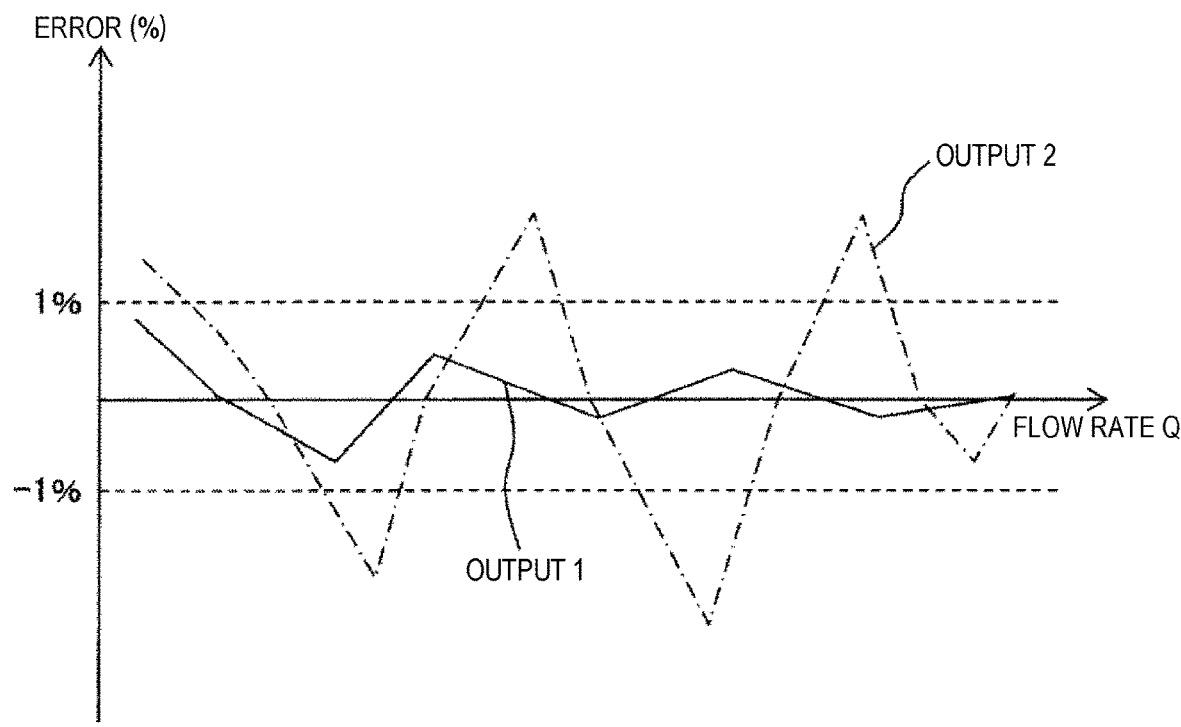
FIG. 11 is a graph illustrating an output error of a thermal flow rate measurement device according to an example of the present invention.

FIG. 11 is a graph illustrating an output error of a thermal flow rate measurement device according to an example of the present invention.

In FIG. 11, output 1 indicates an interpolation error (%) when the gas flow rate detection signal Qa of the gas flow rate detection element 4 is corrected using the gas temperature detection signal Ta from the gas temperature detection element 2 or the substrate temperature detection signal Tp from the temperature sensor 12. In addition, output 2 indicates an interpolation error (%) when the gas flow rate detection signal Qa of the gas flow rate detection element 4 is corrected using the gas temperature detection signal Ta and a temperature detected using a sensor (e.g., an external thermistor) other than the temperature sensor 12. For the outputs 1 and 2, when the reference input flow rate and the reference input temperature correspond to the grid point 101 (setting point 105), the correction constant set at the grid point 101 can be used as it is, and linear interpolation is not needed to be performed and an interpolation error does not occur. Therefore, the interpolation error is 0% when the reference input flow rate and the reference input temperature correspond to the grid point 101 (setting point 105).

In the examples according to the present invention, as in the case of the output 2 of FIG. 11, the grid point 101 (setting point 105) is displaced between the outputs 1 and 2 when the gas flow rate detection signal Qa is corrected using the gas temperature detection element 2 and a temperature of a temperature sensor different from the temperature sensor 12. Therefore, a flow rate point at which the interpolation error is 0% is displaced. That is, a flow rate point at which the output 1 traverses the flow rate axis (interpolation error 0%) and a flow rate point at which the output 2 traverses the flow rate axis (interpolation error 0%) are at different positions. In addition, as described in conjunction with FIG. 14, a point (peak position) at which the interpolation error is maximized is present between the grid points 101 (setting points 105), and the peak position of the output 1 and the peak position of the output 2 are at different positions.

Meanwhile, the grid points 101 at which the correction constants are set are arranged at regular intervals when the correction map 100' is used in which the correction constant determined by linear interpolation performed between the plurality of correction constant acquisition points 102 is stored at the grid point 101 of the orthogonal grid. In addition, no matter what temperature sensor or temperature detection element is used, the intervals (i.e., intervals of setting points of the correction constant) of the grid points 101 are constant and do not change. As a result, a flow rate point at which the output 1 traverses the flow rate axis (interpolation error 0%) and a flow rate point at which the output 2 traverses the flow rate axis (interpolation error 0%) are at the same position. In addition, a point (peak position) at which the interpolation error is maximized is present between the grid points 101, and the peak position (flow rate point) of the output 1 and the peak position (flow rate position) of the output 2 are at the same position.

When the distortion grid is used, no matter what method is used, the feature illustrated in FIG. 11 is provided. Then, the thermal flow rate measurement device 1 according to the present example can change the grid position to each temperature and each flow rate.

Herein, as a support for supporting the intake flow rate detection element 4, an example of the package structure in which a part of the intake flow rate detection element 4 is sealed by resin is described. However, other structures, e.g., a ceramic substrate, a printed circuit board, a resin molded body, that support the intake flow rate detection element 4 and divide the intake gas, may be adopted.

In the examples of the present invention, the two-dimensional correction map (two-dimensional correction table) of intake temperature and intake flow rate is provided. A division interval of the intake flow rate correction map differs from a division interval at the time of normal temperature even when the intake temperature varies, and an optimal division temperature is provided at each temperature. Thus, it is possible to provide a thermal flow rate measurement device that is capable of highly accurate temperature correction.

In addition, the present invention includes the correction map (correction table) for correcting the detected intake flow rate and the intake temperature detection element for detecting the intake temperature. The grid intervals (resolution) of the correction map of the intake flow rate is optimized depending on the intake temperature, and thus the intake temperature is not affected even in environments where the temperature changes largely such that the intake gas flow rate can be detected with high accuracy.

In addition, simple storage of the correction value determined experimentally or the like results in an enormous data amount required for storage of the correction value, further resulting in a large-scale device. However, with the examples according to the present invention, the amount of data required for storage of the correction value can be reduced, and the device can be reduced in size.

REFERENCE SIGNS LIST 1 thermal flow rate measurement device (gas flow rate measurement device)
2 gas temperature detection element
3 intake passage body (intake pipe)
4 intake flow rate detection element
5 substrate
6 main passage
7 sub-passage
8 flow of gas (air)
9 stationary resistor
10 digital signal processing circuit DSP
11 analog-to-digital converter AD1
12 temperature sensor in integrated circuit
13 analog-to-digital converter AD2
14 analog-to-digital converter AD3
15 PROM(EPROM)
16 digital-to-analog converter DA1
17 free-running counter FRC1
18 digital-to-analog converter DA2
19 free-running counter FRC2
20 oscillator
21 integrated circuit
22 gas temperature detection circuit
23 regulator 24 multiplexer MUX1
25 multiplexer MUX2
26 engine control unit ECU
27 SENT generator
28 chip package
29 switch
30A expansion table
30B expansion table
31 table
100A correction map
100B correction map
101 grid point
102 correction constant acquisition point (acquisition point)
103 horizontal grid
104 vertical grid
105 setting point of correction constant

The invention claimed is:

1. A gas flow rate measurement device comprising:
a flow rate detection element configured to detect a flow rate in a state of having an effect of an environment temperature;
a temperature detection unit configured to detect an environment temperature;
a storage unit configured to be set on a correction map formed of a vertical axis and a horizontal axis in which either one of the vertical axis and the horizontal axis is an input flow rate axis and the other is an input temperature axis, the storage unit storing a correction amount of a flow rate detection signal detected by the flow rate detection element; and
a correction arithmetic unit configured to correct the flow rate detection signal using the correction amount stored in the storage unit,
wherein the correction amount is a correction amount in which an acquisition point is at a position displaced from a grid point of an orthogonal grid in which a plurality of vertical grids and a plurality of horizontal grids, which are mutually orthogonal, are arranged in a direction of the horizontal axis and in a direction of the vertical axis, respectively, on the correction map,
the storage unit stores positional information of the acquisition point on the correction map, and
the correction arithmetic unit, at a time of flow rate measurement, determines a reference input flow rate that refers to the correction map on a basis of the positional information from a flow rate detection signal detected by the flow rate detection element, determines a reference input temperature that refers to the correction map on a basis of the positional information from a temperature detection signal detected by the temperature detection unit, and determines a correction amount corresponding to an input flow rate of the input flow rate axis corresponding to the reference input flow rate and an input temperature of the input temperature axis corresponding to the reference input temperature.

2. The gas flow rate measurement device according to claim 1,
wherein the acquisition point of the correction amount on the correction map is set as a setting point of the correction amount on the correction map, and the positional information is an input flow rate value of the setting point of the input flow rate axis and an input temperature value of the setting point of the input temperature axis.

3. The gas flow rate measurement device according to claim 1,
wherein the acquisition point of the correction amount on the correction map is re-arranged to correspond to the grid point of the orthogonal grid, and the positional information is information that associates the acquisition point with the grid point.

4. The gas flow rate measurement device according to claim 3,
wherein, among the positional information, positional information related to the input flow rate axis, positional information related to the input temperature axis, or both positional information related to the input flow rate axis and positional information related to the input temperature axis is formed to include a secondary or higher function and a coefficient of a highest degree of the function.

5. The gas flow rate measurement device according to claim 2,
wherein an error that occurs in a flow rate correction signal obtained by correcting a flow rate detection signal detected by the flow rate detection element is 0% in an input flow rate value of the setting point, and, with an error characteristic when a temperature detection signal detected by the temperature detection unit is used and with an error characteristic when a temperature detection signal detected by a temperature sensor other than the temperature detection unit is used, an error is 0% in different input flow rate values.

6. The gas flow rate measurement device according to claim 3,
wherein an error that occurs in a flow rate correction signal obtained by correcting a flow rate detection signal detected by the flow rate detection element is 0% in an input flow rate value of the grid point, and, with an error characteristic when a temperature detection signal detected by the temperature detection unit is used and with an error characteristic when a temperature detection signal detected by a temperature sensor other than the temperature detection unit is used, an error is 0% in different input flow rate values.

* * * * *